(12) United States Patent
Khanin et al.

(10) Patent No.: US 8,974,174 B2
(45) Date of Patent: Mar. 10, 2015

(54) AXIAL FLOW GAS TURBINE

(75) Inventors: Alexander Anatolievich Khanin, Moscow (RU); Valery Kostege, Moscow (RU)

(73) Assignee: Alstom Technology Ltd., Baden (CH)

( * ) Notice: Subject to any disclaimer, the term of this patent is extended or adjusted under 35 U.S.C. 154(b) by 568 days.

(21) Appl. No.: 13/306,042

(22) Filed: Nov. 29, 2011

(65) Prior Publication Data

US 2012/0134785 A1     May 31, 2012

(30) Foreign Application Priority Data

Nov. 29, 2010   (RU) ................................ 2010148725

(51) Int. Cl.
*F01D 5/08*   (2006.01)
*F01D 25/12*   (2006.01)
*F01D 9/00*   (2006.01)
*F01D 11/08*   (2006.01)
*F02C 7/18*   (2006.01)

(52) U.S. Cl.
CPC  *F01D 9/00* (2013.01); *F01D 11/08* (2013.01); *F02C 7/18* (2013.01); *F05D 2240/11* (2013.01); *F05D 2260/20* (2013.01); *F05D 2260/205* (2013.01)
USPC ........................... 415/115; 415/177; 415/191

(58) Field of Classification Search
CPC ....... F01D 5/08; F01D 25/12; F05D 2240/15; F05D 2240/81
USPC .......................................... 415/115, 191, 177
See application file for complete search history.

(56) References Cited

U.S. PATENT DOCUMENTS

| 3,034,298 | A | * | 5/1962 | White ............................. 60/726 |
| 3,583,824 | A | * | 6/1971 | Smuland et al. .............. 415/117 |
| 3,628,880 | A | * | 12/1971 | Smuland et al. .............. 415/175 |
| 3,975,901 | A | * | 8/1976 | Hallinger et al. ............... 60/786 |
| 4,280,792 | A |   | 7/1981 | Hartel et al. |

(Continued)

FOREIGN PATENT DOCUMENTS

| CA | 2612042 A1 | 5/2008 |
| CN | 1463321 A | 12/2003 |

(Continued)

OTHER PUBLICATIONS

Extended European Search Report dated Jun. 6, 2013, issued by the European Patent Office in corresponding European Patent Application No. 11190895.0-1607 / 2458155. (6 pages).

(Continued)

*Primary Examiner* — Nathaniel Wiehe
*Assistant Examiner* — Wayne A Lambert
(74) *Attorney, Agent, or Firm* — Buchanan Ingersoll & Rooney PC

(57) ABSTRACT

An axial flow gas turbine (35) has a rotor with alternating rows of air-cooled blades (40) and rotor heat shields, and a stator with alternating rows of air-cooled vanes (41) and stator heat shields (47) mounted on inner rings (46A) reduction in cooling air mass flow and an improved cooling and effective thermal protection of critical parts within the turbine stages of the turbine is achieved by adapting the stator heat shields (47) and outer vane platforms (38) within a turbine stage (TS) to one another such that air (37) leaking through the joints between the outer vane platforms (38) and the adjacent stator heat shields (47) into the hot gas path (42) is directed onto the blade crown (32) of the blades (40).

5 Claims, 4 Drawing Sheets

(56) References Cited

U.S. PATENT DOCUMENTS

| | | | |
|---|---|---|---|
| 4,292,008 A * | 9/1981 | Grosjean et al. | 415/115 |
| 4,311,431 A * | 1/1982 | Barbeau | 415/173.6 |
| 4,329,114 A * | 5/1982 | Johnston et al. | 415/145 |
| 4,497,610 A * | 2/1985 | Richardson et al. | 415/116 |
| 4,522,557 A * | 6/1985 | Bouiller et al. | 415/115 |
| 4,551,064 A * | 11/1985 | Pask | 415/116 |
| 4,668,164 A | 5/1987 | Neal et al. | |
| 4,693,667 A * | 9/1987 | Lenz et al. | 415/115 |
| 4,702,670 A * | 10/1987 | Winter | 415/116 |
| 4,946,346 A * | 8/1990 | Ito | 415/115 |
| 5,165,847 A * | 11/1992 | Proctor et al. | 415/115 |
| 5,374,161 A * | 12/1994 | Kelch et al. | 415/139 |
| 5,470,198 A * | 11/1995 | Harrogate et al. | 415/115 |
| 5,562,408 A | 10/1996 | Proctor et al. | |
| 5,871,333 A * | 2/1999 | Halsey | 415/173.1 |
| 6,082,961 A * | 7/2000 | Anderson et al. | 415/115 |
| 6,126,389 A * | 10/2000 | Burdgick | 415/115 |
| 6,126,390 A * | 10/2000 | Bock | 415/115 |
| 6,261,053 B1 * | 7/2001 | Anderson et al. | 415/115 |
| 6,302,642 B1 * | 10/2001 | Nagler et al. | 415/116 |
| 7,775,769 B1 * | 8/2010 | Liang | 416/97 R |
| 7,938,621 B1 * | 5/2011 | Balsdon et al. | 415/173.1 |
| 2001/0005555 A1 * | 6/2001 | Kreis et al. | 428/596 |
| 2002/0122716 A1 * | 9/2002 | Beacock et al. | 415/1 |
| 2003/0035717 A1 * | 2/2003 | Tiemann | 415/115 |
| 2004/0090013 A1 * | 5/2004 | Lawer et al. | 277/412 |
| 2004/0258517 A1 * | 12/2004 | Naik et al. | 415/116 |
| 2005/0042075 A1 * | 2/2005 | Yang et al. | 415/115 |
| 2005/0123389 A1 | 6/2005 | Morris et al. | |
| 2005/0172634 A1 | 8/2005 | Mukherjee | |
| 2006/0123794 A1 * | 6/2006 | Glasspoole et al. | 60/772 |
| 2008/0131263 A1 * | 6/2008 | Lee et al. | 415/115 |
| 2009/0081027 A1 | 3/2009 | Khanin et al. | |
| 2011/0044802 A1 * | 2/2011 | Di Paola et al. | 415/173.1 |

FOREIGN PATENT DOCUMENTS

| | | |
|---|---|---|
| DE | 102007000516 A1 | 5/2008 |
| GB | 1 322 801 | 7/1973 |
| JP | 10231704 A | 9/1998 |
| JP | 2006 105084 A | 4/2006 |

OTHER PUBLICATIONS

Chinese Office Action and Search Report for Chinese Patent Application No. 201110407943.2 dated Aug. 13, 2014, (English Translation).

Chinese Office Action and Search Report for Chinese Patent Application No. 201110407943.2 dated Aug. 13, 2014.

Office action for Japanese Patent Application No. 2011-260784 dated Oct. 22, 2014.

Office action for Japanese Patent Application No. 2011-260784 dated Oct. 22, 2014, (English Translation).

* cited by examiner

AXIAL FLOW GAS TURBINE

This application claims priority under 35 U.S.C. 119 to Russian Federation application no. 2010148725, filed 29 Nov. 2010, the entirety of which is incorporated by reference herein.

BACKGROUND

1. Field of Endeavor

The present invention relates to gas turbines, and more specifically to an axial flow gas turbine.

Yet more specifically, the invention relates to designing a stage of an axial flow turbine for a gas turbine unit. Generally the turbine stator has a vane carrier with slots where a row of vanes and a row of stator heat shields are installed one after another. The same stage includes a rotor with a rotating shaft with slots where a row of rotor heat shields and a row of blades are installed one after another.

2. Brief Description of the Related Art

The invention relates to a gas turbine of the axial flow type, an example of which is shown in FIG. 1. The gas turbine 10 of FIG. 1 operates according to the principle of sequential combustion. It includes a compressor 11, a first combustion chamber 14 with a plurality of burners 13 and a first fuel supply 12, a high-pressure turbine 15, a second combustion chamber 17 with the second fuel supply 16, and a low-pressure turbine 18 with alternating rows of blades 20 and vanes 21, which are arranged in a plurality of turbine stages arranged along the machine axis MA.

The gas turbine 10 according to FIG. 1 includes a stator and a rotor. The stator includes a vane carrier 19 with the vanes 21 mounted therein; these vanes 21 are necessary to form profiled channels where hot gas developed in the combustion chamber 17 flows through. Gas flowing through the hot gas path 22 in the required direction hits against the blades 20 installed in shaft slits of a rotor shaft and causes the turbine rotor to rotate. To protect the stator housing against the hot gas flowing above the blades 20, stator heat shields installed between adjacent vane rows are used. High temperature turbine stages require cooling air to be supplied into vanes, stator heat shields and blades.

To ensure high-temperature turbine stage operation with a long-term lifespan, all parts of the hot gas path 22 should be cooled effectively. Parts of the known design presented in FIGS. 2(a) and (b) are cooled as follows. Compressed cooling air 24 is delivered from the compressor through a plenum 23 and enters cavities 31 and 29. In the case of cavity 31, this is done by a hole 25. Then this cooling air flows out from the airfoil of vane 21 and through holes 30 and 28 of the stator heat shield 27, which is attached to an inner ring 26 opposite to the blade 20, into the turbine flow path 22. The thin-walled crown 32 (FIG. 2(b)) of the peripheral blade zone (the blade tip) is very sensitive to high gas temperature. Cooling air escaping from holes 30 situated in the forward part of the stator heat shield 27 in the design of FIG. 2 contributes to lowering the temperature of the blade crown 32 (in addition to the blade cooling system itself, which is not explicitly shown in the figure).

However, the above described design can have the following disadvantages:

1. Due to the large distance from the outlets of holes 30 to the leading edge of the blades 20, cooling air jets soon lose their energy and are washed out with hot gas from the hot gas path 22.

2. Air flowing out of holes 30 has a rather high temperature, since it has already cooled a substantial surface area of the stator heat shield 27.

3. No effective blowing through with cooling air is provided for the space between adjacent stator heat shields 27 (FIG. 2(b)), and this increases the overheating risk for sealing plates 33 and side surfaces of the stator heat shields 27.

SUMMARY

One of numerous aspects of the present invention includes a gas turbine with a turbine stage cooling scheme which can avoid the drawbacks of the known cooling configuration and combines a reduction in cooling air mass flow with an improved cooling and effective thermal protection of critical parts within the turbine stages of the turbine.

Another aspect includes a rotor with alternating rows of air-cooled blades and rotor heat shields, and a stator with alternating rows of air-cooled vanes and stator heat shields mounted on inner rings, whereby the stator coaxially surrounds the rotor to define a hot gas path in between, such that the rows of blades and stator heat shields, and the rows of vanes and rotor heat shields are opposite to each other, respectively, and a row of vanes and the next row of blades in the downstream direction define a turbine stage, and whereby the blades of the turbine stage are each provided with a blade crown at their tips and the vanes of the turbine stage are each provided with an outer vane platform. The stator heat shields and outer vane platforms within the turbine stage are adapted to one another such that air leaking through the joints between the outer vane platforms and the adjacent stator heat shields into the hot gas path is directed onto the blade crown of the blades.

According to an embodiment, the outer vane platforms and the adjacent stator heat shields are adapted to one another by providing each of the outer vane platforms with a downstream projection at its rear wall, which projection extends downstream to the leading edge of the blade crowns and into a respective recess at the adjacent stator heat shield.

According to another embodiment, the stator heat shields within the turbine stage are cooled by introducing cooling air into a cavity on the backside of each stator heat shield, which cooling air is discharged into the hot gas path through holes at the downstream and upstream side of the stator heat shield.

According to another embodiment, the vanes within the turbine stage are cooled by introducing cooling air through a hole into a cavity on the backside of the outer vane platform of each vane, and jets of cooling air are directed onto the blade crowns from said cavity by holes running downstream through said projection.

According to another embodiment, the outer vane platform of the vanes is configured such that the cooling air flowing through said holes in said projection has already been used before to cool the respective vane.

According to another embodiment, slits are provided running downstream through said projection to direct cooling air precisely into the interstice between stator heat shields being adjacent in the circumferential direction.

According to another embodiment, additional holes are provided at the outer vane platforms to direct cooling air from the cavity on the backside of the outer vane platform downstream onto the blade crowns below said projection.

BRIEF DESCRIPTION OF THE DRAWINGS

The present invention is now to be explained more closely by means of different embodiments and with reference to the attached drawings.

DETAILED DESCRIPTION OF EXEMPLARY EMBODIMENTS

Figure 1:
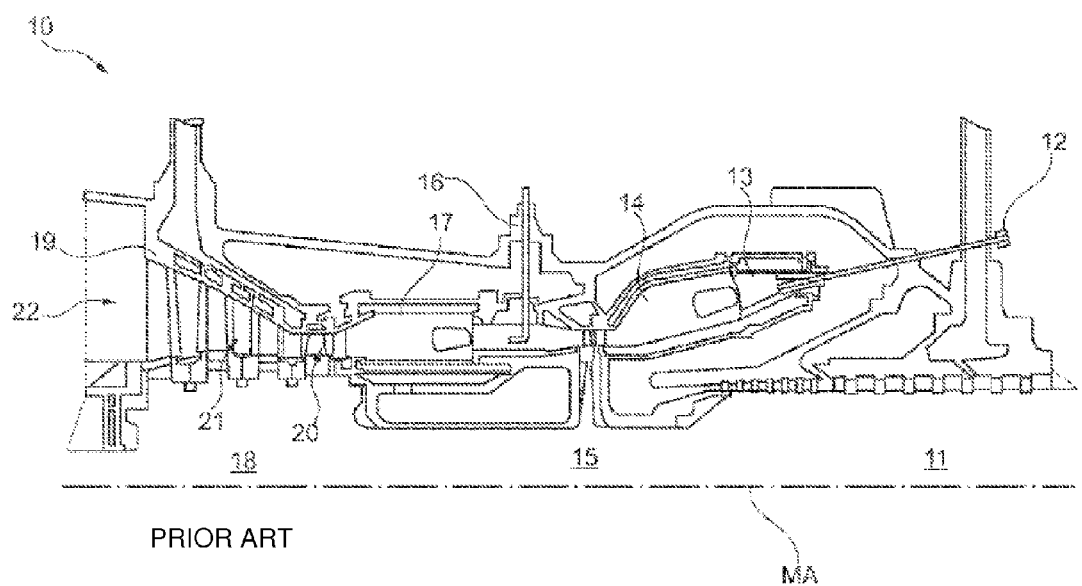
FIG. 1 shows a well-known basic design of a gas turbine with sequential combustion, which may be used with embodiments in accordance with the invention.
Figure 2:
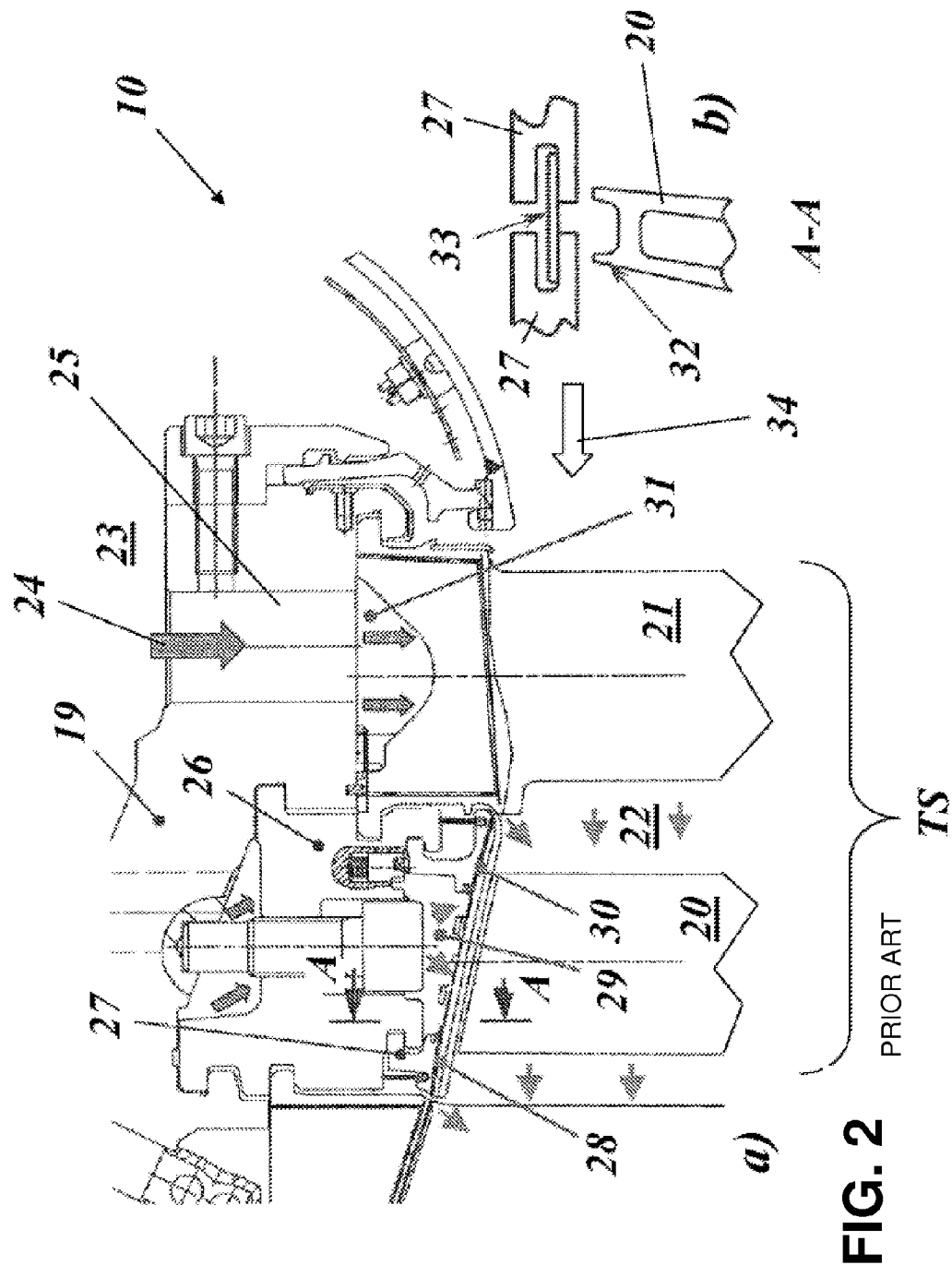
FIG. 2 shows cooling details of a turbine stage of a gas turbine according to the prior art (FIG. 2(a)) with FIG. 2(b) showing a detail of the blade crown configuration.
Figure 3:
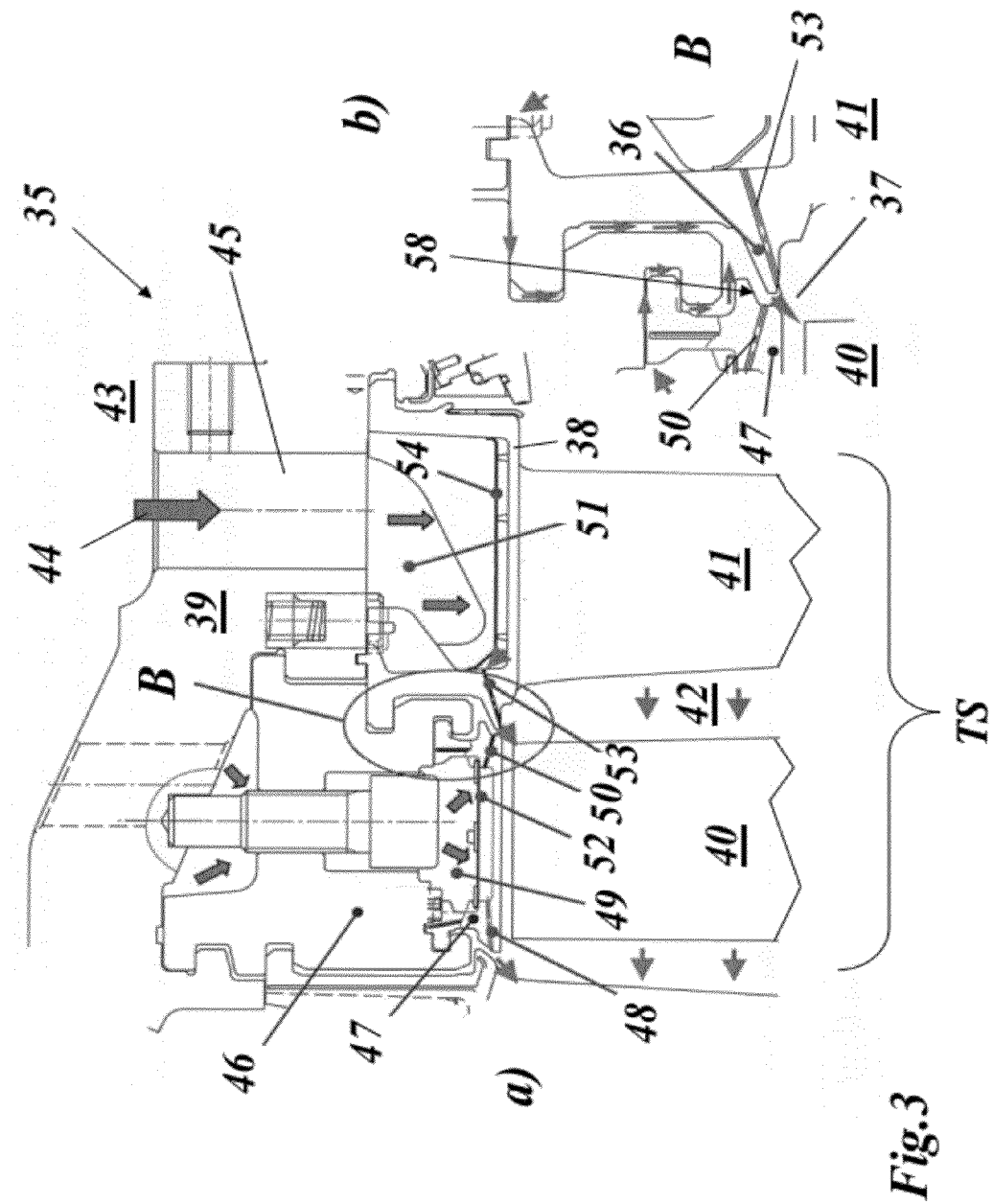
FIG. 3 shows cooling details of a turbine stage of a gas turbine according to an embodiment of the invention (FIG. 3(a)) with FIG. 3(b) showing the magnified zone B of FIG. 3(a)

FIG. 3 presents a proposed design of the high-temperature turbine stage where disadvantages inherent to the design demonstrated in FIG. 2 can consequently be eliminated.

According to the new and advantageous design of FIG. 3, the gas turbine 35 includes a turbine stage TS with vanes 41 attached to a vane carrier 39 and blades 40 being moved by the hot gas flowing through the hot gas path 42. Opposite to the blade tips of the blades 40, stator heat shields 47 are arranged on an inner ring 46. The vanes 41, which each include an outer vane platform 38, are cooled by cooling air 44 flowing from a plenum 43 through a hole 45 into the cavity 51. According to principles of the present invention, the outer vane platform 38 and the stator heat shield 47 are designed and are adapted to one another such that air 37 leaking through the joints between the outer vane platforms 38 and the adjacent stator heat shields 47 into the hot gas path 42 is directed onto the blade crown 32 of the blades 40 flow (FIG. 3(b)). This means that cooling air is fed to the slit between adjacent stator heat shields 47 and to the blade crown of blades 40 through a minimum possible distance.

This direct cooling of them blade crowns and stator heat shield slits is implemented by providing a projection 36 situated on the rear wall of the outer vane platform 38. To get the end of projection 36 close to the blades 40 to a maximum extent, a special recess 58 is provided in the stator heat shields 47. The stator heat shield 47 is cooled in the same way as shown in FIG. 2, i.e., cooling air enters into the cavity 49, passes through holes 52 in the stator heat shield 47, and is discharged through holes 48 and 50.

Also, the vane 41 is cooled similarly to the vane 21 in FIG. 2; however, the blade crown of the blades 40 is cooled more effectively, because air jets from holes 53 running through the projection 36 bring the cooling air close to the blade to the maximum extent, so that they have no time to lose their energy and to be washed out with hot gas from the hot gas path 42.

Another advantage is that the cooling air, which is supplied to holes 53, has already passed through holes 54 of a perforated sheet and cooled a portion of the outer vane platform 38. Thus, as the blade crown is cooled with cooling air, which has already been used for cooling another part, turbine efficiency is improved.

Figure 4:
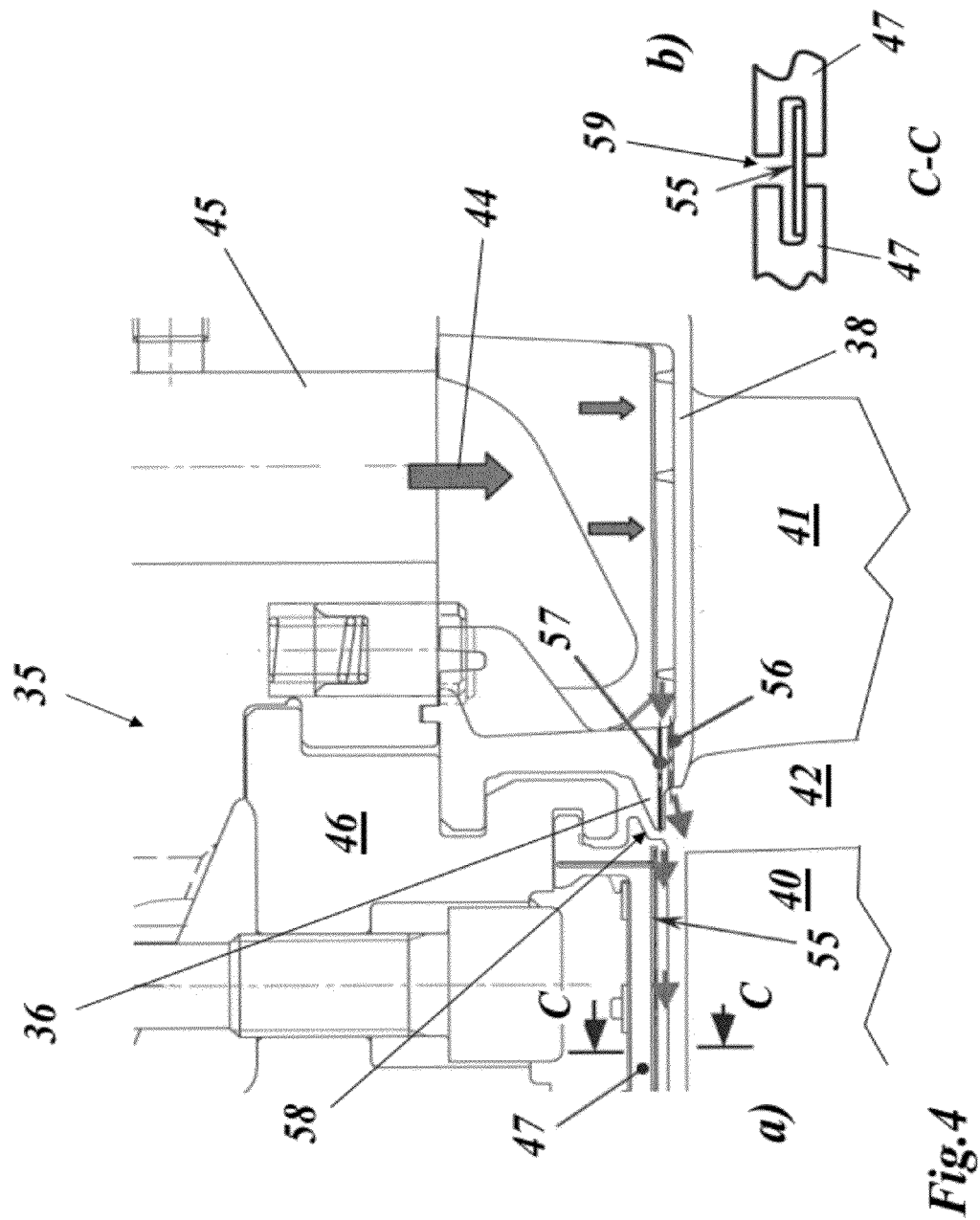
FIG. 4 shows a modification of the cooling scheme with enhanced sealing plate cooling.

The projection 36 on the outer vane platform 38 results in still another advantage of the proposed design (see FIG. 4). It enables the interstice 59 between adjacent stator heat shields 47 (FIG. 4(b)) to be blown through with powerful air jets spurting from slits 57 arranged precisely in the middle between adjacent stator heat shields 47 in the circumferential direction. These jets protect the side surfaces of the stator heat shields 47 and the sealing plates 55 between these stator heat shields 47 against negative hot gas effects. In addition to the supply of utilized air by holes 53 to the blade crowns and through slits 57 into the interstices 59 between adjacent stator heat shields 47, a further supply of utilized air supply may be provided through holes 56.

In summary, devices embodying principles of the present invention can have the following advantages:

1. The shapes of both the stator heat shields 47 and the projection 36 made in the outer vane platform 38 make it possible to bring cooling air jets very close to the blade crowns of blades 40. This improves the effectiveness of the cooling of these elements substantially.

2. To cool the stator heat shields 47 and blade crowns, air that has already been used for cooling the vanes 41, is used. This dual use of cooling air has improves the turbine efficiency.

3. The interstice 59 between adjacent stator heat shields 47 is blown through effectively.

4. Leaking air 37 from cavities 49 and 51 within the joint zones with inner rings 46 and vane carrier 39 (see FIG. 3) is successfully used for cooling due to exiting nearer to the blade crowns.

Thus, a combination using mutually adapted beneficial shapes of the stator heat shields 47 and the projection 36 (see FIG. 3) in connection with utilization of cooling air discharged from the outer vane platform 38 makes it possible to create a modern turbine with good performance and continuous blade life time.

List Of Reference Numerals
10,35 gas turbine
11 compressor
12,16 fuel supply
13 burner
14,17 combustion chamber
15 high-pressure turbine
18 low-pressure turbine
19,39 vane carrier (stator)
20,40 blade
21,41 vane
23,43 plenum
24,44 cooling air
25,45 hole
26,46 inner ring
27,47 stator heat shield
28,48 hole
29,49 cavity
30,50,52 hole
31,51 cavity
32 blade crown
33,55 sealing plate
34 hot gas
36 projection
37 leaking air (at joint between stator heat shield and vane)
38 outer vane platform
42 hot gas path
53,54,56 hole
57 slit
58 recess
59 interstice
MA machine axis
TS turbine stage While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. An axial gas turbine comprising:
a rotor with alternating rows of air-cooled blades and rotor heat shields;
a stator with a vane carrier, alternating rows of air-cooled vanes, and stator heat shields mounted on the vane carrier, wherein the stator coaxially surrounds the rotor to define a hot gas path therebetween, such that the rows of blades and stator heat shields, and the rows of vanes and rotor heat shields, are opposite to each other, respectively, and a row of vanes and an adjacent row of blades in the downstream direction define a turbine stage;
a cavity on a backside of each stator heat shield; and
holes at downstream and upstream sides of the stator heat shield;
wherein the stator heat shields within the turbine stage are cooled when cooling air is introduced into the cavity of each stator heat shield, the cooling air being discharged into the hot gas path through the holes of the stator heat shield;
wherein the blades of the turbine stage each comprise a tip and a blade crown on the tip, and the vanes of the turbine stage each comprise an outer vane platform;
wherein the stator heat shields and the outer vane platforms within the turbine stage are adapted to one another such that air leaking through joints between the outer vane platforms and adjacent stator heat shields into the hot gas path is directed onto the blade crowns of the blades;
wherein each of the outer vane platforms comprises a downstream projection at a rear wall, and each of the adjacent stator heat shields comprises a recess, the projection extends downstream to a leading edge of the blade crown of a respective one of the blades and into a respective recess;
a hole and a cavity on the backside of the outer vane platform of each vane, and holes running downstream through said projection;
wherein the vanes within the turbine stage are cooled when introducing cooling air through the hole on the backside of each outer vane platform, and jets of cooling air are directed onto the blade crowns from said cavity on the backside of each stator heat shield by the holes running downstream through said projection of each outer vane platform;
slits running downstream through said projection, the slits being configured and arranged to direct cooling air into an interstice between circumferentially adjacent stator heat shields; and
additional holes at the outer blades platforms configured and arranged to direct cooling air from the cavity on the backside of each of the outer vane platforms downstream onto the blade crowns of the blades below said projections of the outer vane platforms.

2. The axial gas turbine according to claim 1, wherein the outer vane platforms of the vanes are configured such that the cooling air flowing through said holes in said projections have already been used before to cool the respective vanes.

3. The axial gas turbine of claim 1, wherein the holes running downstream through said projection are positioned to bring the cooling air close to the respective one of the blades to a maximum extent.

4. The axial gas turbine of claim 1, wherein the slits are arranged so that cooling air is fed to the slits and the blade crowns through a minimum possible distance.

5. The axial gas turbine of claim 1, wherein the projection of each of the outer vane platforms is positioned such that an end of the projection is close to the respective one of the blades to a maximum extent via the recess receiving that end of the projection.

* * * * *